April 25, 1939.   G. A. GEYER   2,155,416
TUBE EXPANDER
Filed March 19, 1938
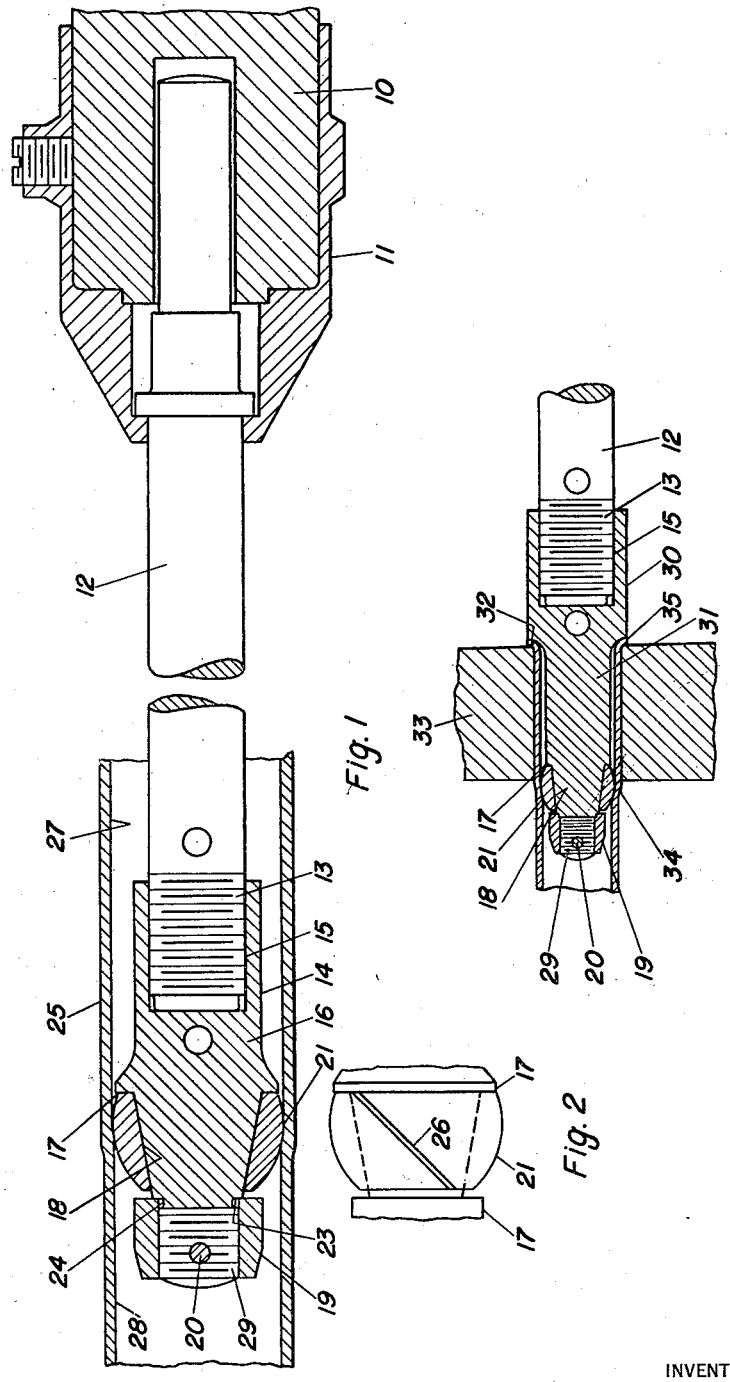
INVENTOR
*GEORGE A. GEYER*
BY
*Ransom K. Davis*
ATTORNEY Patented Apr. 25, 1939

2,155,416

UNITED STATES PATENT OFFICE 2,155,416

TUBE EXPANDER

George A. Geyer, Richmond Hill, N. Y.

Application March 19, 1938, Serial No. 196,898

1 Claim. (Cl. 153—80)

(Granted under the act of March 3, 1883, as amended April 30, 1928; 370 O. G. 757)

This invention relates to a tube expander, and has for an object to provide a tube expander especially adapted for expanding the ends of tubes when fastening them to boiler drums or sheets in making boilers, as well as fastening condenser tubes to their drums or sheets.

A further object of this invention is to provide a device for expanding tubes and at the same time for flaring out the ends in the same operation.

A further object of this invention is to provide an expander in the form of a ball drift which will produce a highly burnished surface that will prolong the life of the tube through eliminating the flaking and thinning out that is often produced with the conventional roller type tube expanders.

A further object of this invention is to provide a ball drift expander which may be used in conjunction with a hydraulic press or arbor press as well as with a pneumatic hammer or other suitable source of intermittent or continuous pressure.

A further object of this invention is to provide a ball drift which may be easily disengaged by an initial retractive motion to disengage it and permit it to be withdrawn without any effort.

A further object of this invention is to provide a ball drift which is conical shaped and split diagonally to thereby eliminate scarring the tube during the expanding operation, and which is so mounted as to expand itself during the expanding operation, and which will contract to permit it to be withdrawn without effort.

With the foregoing and other objects in view, the invention consists in the construction, combination and arrangement of parts hereinafter described and illustrated in the drawing, in which:

Fig. 1 is a partly sectional and partly elevational view of the expander form of this invention in operation on a boiler tube.

Fig. 2 is an elevational view of the ball drift; and

Fig. 3 is a partly sectional, fragmentary view of the expander and tube end flaring form of this invention in operation on a condenser tube and sheet.

There is shown at 10 the hammer end of a pneumatic hammer or other power device provided with an adapter 11 for securing a tool shank 12 thereto, the tool shank 12 terminating in a threaded end 13. Secured to this shank end 13 is the ball drift holder 14 consisting of a female threaded end 15, a body portion 16 connecting by a shoulder 17 to a frusto-conical taper portion 18, the taper portion 18 having a shoulder 23 and neck 24 connecting it to a male threaded end 29 for receiving a ball holding nut 19, the threaded end 29 and nut 19 having juxtaposed dowel holes when the nut is screwed against shoulder 23, whereby dowel 20 may be inserted to prevent the nut 19 from unthreading.

On the frusto-conical or taper portion 18 is placed the internally conical externally spherical ball drift 21, which is slit diagonally as at 26, the inside of the ball being shaped to correspond with the shape of the taper portion 18.

In operation, the ball drift is inserted into a boiler tube 25 and the pneumatic hammer or power source is operated to force the tool shank into the tube. This causes the ball drift 21 to expand along its diagonal split 26 and travel up the taper portion 18 until it abuts the shoulder stop 17. Further operation then causes the ball drift 21 to expand the tube 25 from the size at 28 to the size at 27. The surface of the ball drift being highly polished, the resulting inner surface at 27 is correspondingly smooth and polished as a result. If the tube 25 is being inserted into a boiler, its end is placed in the appropriate aperture in the boiler drum, and then the ball drift is passed therethrough, expanding the tube into a tight, leakproof fit with the sides of the aperture of the boiler drum or sheet. To remove the ball drift, the shank is slightly withdrawn, causing the ball drift to travel down its taper 18 and contact, permitting easy withdrawal.

In Fig. 3 is shown an application of this invention to a condenser tube and sheet, in further combination with a device for flaring the end of the tube in the sheet. The parts in this figure which are identical with those of the first form bear the identical reference numerals. This flaring and ball drift tool 30 has a long body portion 31 connecting the female threaded end 15 to its shoulder 17. The body portion 31 is provided with a smoothly curved wedge portion 32 at its upper end connecting it to the female end 15, the distance between the maximum diameter of the ball drift 21 and the wedge portion 32 being substantially equal to the thickness of the condenser sheet 33.

Then, as the ball drift and flaring tool 30 is inserted into the condenser tube 34, the condenser tube 34 is expanded into a tight fit within the aperture through the condenser sheet 33, and finally the wedge portion 32 reaches the end of the condenser tube 34 and flares it outwardly as at 35 against the outside of the condenser sheet 33.

Other modifications and changes in the proportions and arrangements of the parts may be made by those skilled in the art without departing from the nature of the invention, within the scope of what is hereinafter claimed.

The invention described herein may be manufactured and used by or for the Government of the United States of America for governmental purposes without the payment of any royalties thereon or therefor.

Having thus set forth and disclosed the nature of this invention, what is claimed is:

A tube expander comprising a frusto-conical member having a shoulder terminating its greatest diameter and an internally conical externally spherical diagonally slit expanding member carried on said frusto-conical member, whereby when said members are forced through a tube to be expanded, said spherical member may expand until it abuts said shoulder to then expand the tube, and when said members are retracted, said spherical member may contract to permit easy removal.

GEORGE A. GEYER.